US012790864B2

(12) United States Patent
Prior et al.

(10) Patent No.: US 12,790,864 B2
(45) Date of Patent: Nov. 10, 2026

(54) VEHICLE CLOSURE MEMBER SYSTEMS WITH INTEGRATED BOTTLE OPENER FEATURES

(71) Applicant: FORD GLOBAL TECHNOLOGIES, LLC, Dearborn, MI (US)

(72) Inventors: Joseph Prior, Detroit, MI (US); Joshua Robert Hemphill, White Lake, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 499 days.

(21) Appl. No.: 18/350,000

(22) Filed: Jul. 11, 2023

(65) Prior Publication Data

US 2025/0020011 A1 Jan. 16, 2025

(51) Int. Cl.

*E05D 11/00* (2006.01)
*E05D 3/00* (2006.01)
*E05D 5/04* (2006.01)

(52) U.S. Cl.

CPC ................ *E05D 11/00* (2013.01); *E05D 3/00* (2013.01); *E05D 5/043* (2013.01); *E05Y 2800/10* (2013.01); *E05Y 2900/531* (2013.01)

(58) Field of Classification Search

CPC ........... E05D 11/00; E05D 3/00; E05D 5/043; E05D 5/0207; E05D 7/00; E05Y 2800/10;

(Continued)

(56) References Cited

U.S. PATENT DOCUMENTS 3,570,027 A 3/1971 Steiner
5,649,734 A 7/1997 Speis (Continued)

FOREIGN PATENT DOCUMENTS

CN 87209883 U 2/1988
CN 2048470 U 11/1989

(Continued)

OTHER PUBLICATIONS

Amazon—E-cowlboy Door Hinge Cover Trim Exterior Accessories Dec. 7, 2020 https://www.amazon.com/Exterior-Accessories-2018-2021-Unlimited-Gladiator/dp/B08PVB6VCW?th=1 (Year: 2020).*

(Continued)

*Primary Examiner* — Wenwei Zhuo
(74) *Attorney, Agent, or Firm* — Vichit Chea; Carlson, Gaskey & Olds, P.C.

(57) ABSTRACT

This disclosure details vehicle closure member systems that include integrated features for increasing the functionality of a closure member (e.g., a swing gate) of the system. A bottle opener feature may be integrated as part of a hinge assembly that movably mounts the closure member relative to a vehicle body. A bottle cap catch feature may be integrated as part of a trim piece that at least partially conceals portions of the hinge assembly, and the bottle cap catch feature may function to collect bottle caps that are dislodged by the bottle opener feature. The integrated bottle opener and bottle cap catch features are conveniently packaged on the vehicle for use during outdoor social gatherings when the closure member is moved to an open position during stationary, non-moving conditions of the vehicle.

20 Claims, 3 Drawing Sheets

(58) Field of Classification Search
CPC ......... E05Y 2900/531; E05Y 2900/532; B67B 7/44; B67B 7/16; B60J 5/10; B60J 5/101; B60J 5/105; B60J 5/107; B60J 5/0493
USPC ......... 296/1.07, 1.08, 39.1, 202, 152, 146.7, 296/146.8, 146.11
See application file for complete search history.

(56) References Cited

U.S. PATENT DOCUMENTS

| | | | | |
|---|---|---|---|---|
| 10,759,351 | B2 | 9/2020 | Westcott | |
| 11,097,646 | B2 | 8/2021 | Dietrich et al. | |
| 2005/0279549 | A1 * | 12/2005 | Kurtz, Jr. .............. | E02F 9/0891 180/69.2 |
| 2022/0063978 | A1 | 3/2022 | Arellano Aguilar et al. | |
| 2022/0220782 | A1 | 7/2022 | Strole et al. | |
| 2022/0267132 | A1 * | 8/2022 | Doman ................... | E05D 3/022 |
| 2023/0036589 | A1 * | 2/2023 | Brewster ............... | E05D 7/1044 |
| 2026/0091968 | A1 * | 4/2026 | Mondragon Hernandez ............... | B67B 7/16 |

FOREIGN PATENT DOCUMENTS

| | | | | |
|---|---|---|---|---|
| CN | 2108714 | U | 7/1992 | |
| CN | 202322289 | U | 7/2012 | |
| CN | 106044674 | A | 7/2016 | |
| CN | 207725316 | U * | 8/2018 | |
| EP | 2388230 | A1 | 11/2011 | |
| FR | 2892345 | A1 * | 4/2007 | ............ B60J 5/0468 |
| GB | 2473489 | A | 3/2011 | |
| WO | 2009068004 | A1 | 6/2009 | |
| WO | 2016131602 | A1 | 8/2016 | |

OTHER PUBLICATIONS

Amazon—Hooke Door Hinge Step Roof Access w_Bottle Opener Dec. 29, 2021 https://www.amazon.com/Hooke-Road-Wrangler-Access-Compatible/dp/B09PDP7SSP/ (Year: 2021).*

Amazon—iJDMTOY Stainless Steel Side Door Fit Bottle Opener Oct. 5, 2021 https://www.amazon.com/iJDMTOY-Stainless-Steel-Compatible-Wrangler/dp/B09HSTXJMQ/ (Year: 2021).*

Queveau et al. (FR 2892345 A1) (Year: 2007).* https://www.quora.com/How-can-I-open-a-beer-bottle-without-any-tools; Dated 5 years ago; Accessed Feb. 7, 2026 (Year: 2021).*

YouTube—BuzzFeedVideo—Ways to Open A Beer Without A Bottle Opener Jan. 21, 2016 (Year: 2016).*

* cited by examiner

VEHICLE CLOSURE MEMBER SYSTEMS WITH INTEGRATED BOTTLE OPENER FEATURES

TECHNICAL FIELD

This disclosure relates generally to motor vehicles, and more particularly to vehicle closure member systems that are equipped with integrated bottle opener-related features for providing added functionality that can be used while the vehicle is stationary.

BACKGROUND

Vehicles can be utilized as social gathering spots during outdoor activities, such as camping and tailgating activities. Vehicle users typically must remember to carry various tools and convenience items on the vehicle, such as bottle openers for example, for facilitating a more enjoyable experience during the outdoor social activities.

SUMMARY

A vehicle closure member system according to an exemplary aspect of the present disclosure includes, among other things, a hinge bracket, and a bottle opener feature at least partially provided by a portion of the hinge bracket.

In a further non-limiting embodiment of the foregoing vehicle closure member system, the hinge bracket is a body-side hinge bracket of a hinge assembly of the vehicle closure member system.

In a further non-limiting embodiment of either of the foregoing vehicle closure member systems, the hinge assembly further includes a door-side hinge bracket that is movably connected to the body-side hinge bracket by a pivot pin.

In a further non-limiting embodiment of any of the foregoing vehicle closure member systems, the portion is a contact edge of an arm of the hinge bracket.

In a further non-limiting embodiment of any of the foregoing vehicle closure member systems, the contact edge is part of a lower wall that bounds a recessed cavity of the arm.

In a further non-limiting embodiment of any of the foregoing vehicle closure member systems, the hinge bracket is mounted to a hinge attach bracket.

In a further non-limiting embodiment of any of the foregoing vehicle closure member systems, the contact edge and a contact surface of the hinge attach bracket cooperate to apply an opening force for removing a bottle cap from a bottle.

In a further non-limiting embodiment of any of the foregoing vehicle closure member systems, the hinge bracket is at least partially concealed by a trim piece.

In a further non-limiting embodiment of any of the foregoing vehicle closure member systems, a bottle cap catch feature is provided by the trim piece.

In a further non-limiting embodiment of any of the foregoing vehicle closure member systems, an opening and a trough of the trim piece cooperate to establish the bottle cap catch feature.

A vehicle according to another exemplary aspect of the present disclosure includes, among other things, a vehicle body, a closure member, and a first hinge assembly configured to movably support the closure member relative to the vehicle body. The first hinge assembly includes an integrated bottle opener feature.

In a further non-limiting embodiment of the foregoing vehicle, the first hinge assembly includes a body-side hinge bracket that provides the integrated bottle opener feature.

In a further non-limiting embodiment of either of the foregoing vehicles, the body-side hinge bracket is secured to a hinge attach bracket, and the hinge attach bracket is mounted to the vehicle body.

In a further non-limiting embodiment of any of the foregoing vehicles, the integrated bottle opener feature is established by a contact edge of an arm of the body-side hinge bracket and a contact surface of a lower edge of the hinge attach bracket.

In a further non-limiting embodiment of any of the foregoing vehicles, the contact edge is part of a lower wall that bounds a recessed cavity of the arm.

In a further non-limiting embodiment of any of the foregoing vehicles, the first hinge assembly is at least partially concealed by a trim piece.

In a further non-limiting embodiment of any of the foregoing vehicles, a bottle cap catch feature is provided by the trim piece.

In a further non-limiting embodiment of any of the foregoing vehicles, an opening and a trough of the trim piece cooperate to establish the bottle cap catch feature.

In a further non-limiting embodiment of any of the foregoing vehicles, the integrated bottle opener feature is accessible through the opening of the trim piece.

In a further non-limiting embodiment of any of the foregoing vehicles, the trough is configured to capture a bottle cap that has been dislodged from a bottle by the integrated bottle opener feature.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details vehicle closure member systems that include integrated features for increasing the functionality of a closure member (e.g., a swing gate) of the system. A bottle opener feature may be integrated as part of a hinge assembly that movably mounts the closure member relative to a vehicle body. A bottle cap catch feature may be integrated as part of a trim piece that at least partially conceals portions of the hinge assembly, and the bottle cap catch feature may function to collect bottle caps that are dislodged by the bottle opener feature. The integrated bottle opener and bottle cap catch features are conveniently packaged on the vehicle for use during outdoor social gatherings when the closure member is moved to an open position during stationary, non-moving conditions of the vehicle. These and other features of this disclosure are described in greater detail below.

Figure 1:
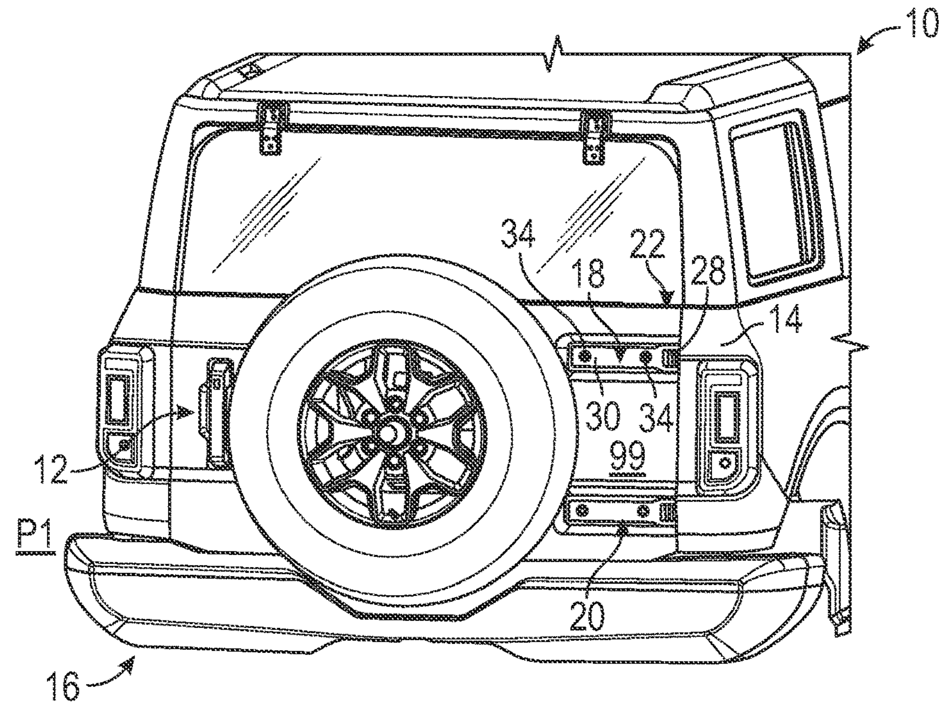
FIG. 1 is a rear perspective view of a motor vehicle equipped with a closure member system. A closure member of the closure member system is positioned in a closed position in FIG. 1.
Figure 2:
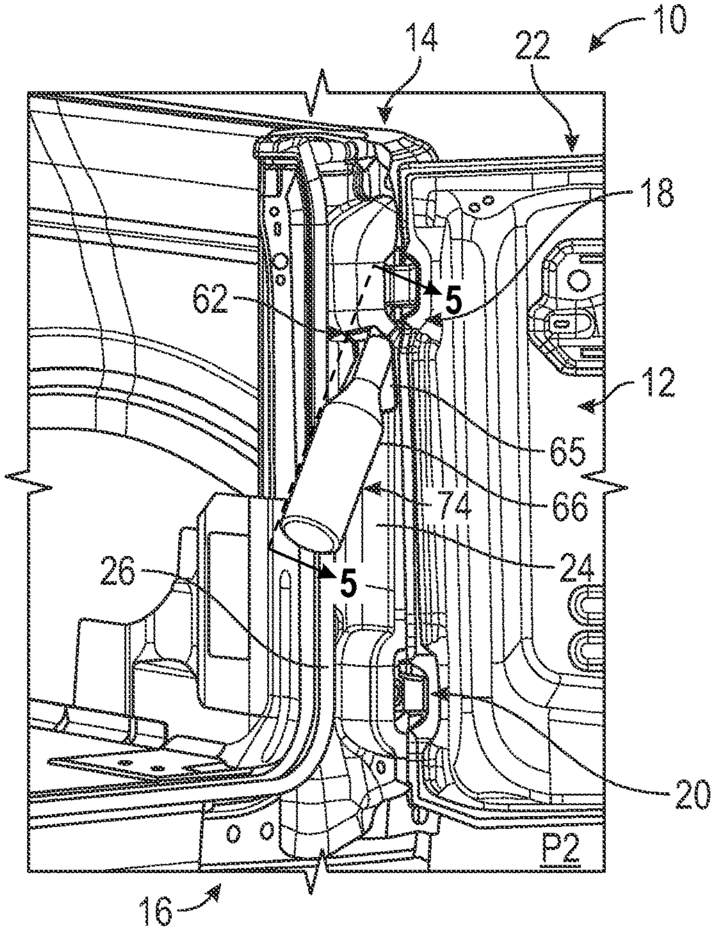
FIG. 2 illustrates an open position of the closure member of FIG. 1.
Figure 3:
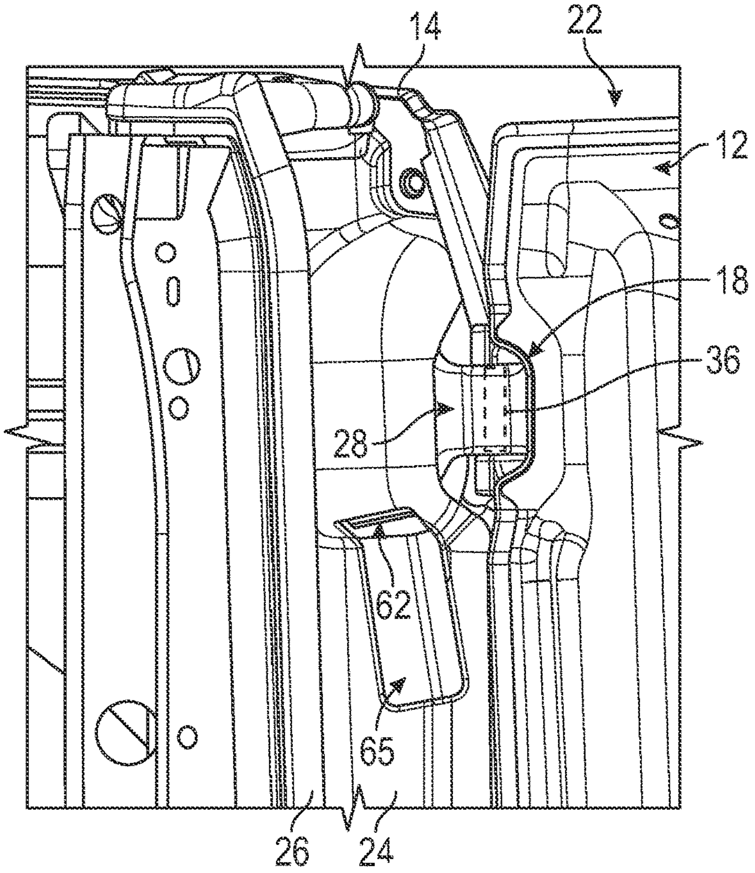
FIG. 3 illustrates select portions of the closure member system of the vehicle of FIG. 1.

FIGS. 1 and 2 schematically illustrate select portions of a motor vehicle 10 (hereinafter referred to simply as "vehicle"). The vehicle 10 may be a car, a truck, a van, a sport utility vehicle, a semi tractor-trailer, or any other type of vehicle. The vehicle 10 could also be a conventional motor vehicle, a traction battery powered hybrid or electric vehicle, or an autonomous vehicle (i.e., a driverless vehicle).

Although a specific component relationship is illustrated in the figures of this disclosure, the illustrations are not intended to limit this disclosure. In other words, the placement and orientation of the various components of the vehicle 10 are shown schematically and could vary within the scope of this disclosure. In addition, the various figures accompanying this disclosure are not necessarily drawn to scale, and some features may be exaggerated or minimized to emphasize certain details of a particular component, assembly, or system.

The vehicle 10 may include one or more closure members 12 that are mounted relative to a vehicle body 14 and configured to move between closed and open positions for accessing a vehicle interior (e.g., a cargo space, a passenger cabin, etc.). In the illustrated embodiment, the closure member 12 is mounted at a rear 16 of the vehicle 10 and is configured as a swing gate. In other implementations, the closure member 12 could be part of a dual out-swinging door system that may be provided at the rear 16 of the vehicle 10 for gaining access to the vehicle interior, such as for loading and/or unloading cargo, for example. However, the teachings of this disclosure are not limited to swing gates and rear out-swinging type doors and could apply to various other types of closure members, including but not limited to side doors, tailgates, etc.

The closure member 12 may be movably mounted to the vehicle body 14 by a first hinge assembly 18 and a second hinge assembly 20. The first and second hinge assemblies 18, 20 may movably support the closure member 12 relative to the vehicle body 14. Together, the closure member 12, the first hinge assembly 18, and the second hinge assembly 20 may establish a closure member system 22 of the vehicle 10. Although two hinge assemblies are illustrated in the exemplary embodiment, the closure member system 22 could include a greater or fewer number of hinge assemblies within the scope of this disclosure.

The first hinge assembly 18 may be mounted at a location of the closure member 12 that is vertically above the second hinge assembly 20. However, other configurations could be possible within the scope of this disclosure. Vertical and horizontal, for purposes of this disclosure, are with reference to ground in an ordinary orientation of the vehicle 10 during operation.

In an embodiment, portions of the first hinge assembly 18 and the second hinge assembly 20 are visible when the closure member 12 is closed. The first and second hinge assemblies 18, 20 may therefore be considered exposed or "Class A" hinge assemblies.

The closure member 12 is shown in a closed position P1 in FIG. 1 and in an open position P2 in FIG. 2. In an embodiment, the open position P2 is a fully open position. When moved to the open position P2, the closure member 12 permits users to access the vehicle interior. When closed, the closure member 12 provides a barrier between the interior and the exterior of the vehicle 10. Although not specifically shown, the closure member 12 may be moved to various angular positions between the closed position P1 and the open position P2.

In an embodiment, the closure member 12 is angularly displaced relative to the vehicle body 14 by about 100° or more when moved to the open position P2. In another embodiment, the closure member 12 is angularly displaced relative to the vehicle body 14 by about 140° when moved to the open position P2. In this disclosure, the term "about" means that the expressed quantities or ranges need not be exact but may be approximated and/or larger or smaller, reflecting acceptable tolerances, conversion factors, measurement error, etc. A total range of motion of the closure member 12 may vary and is dependent on various design criteria.

The closure member system 22 may additionally include a trim piece 24 and a seal 26 (see FIG. 2). The trip piece 24 may be secured to the vehicle body 14 and may be arranged to conceal portions of the first hinge assembly 18 and the second hinge assembly 20 when the closure member 12 is opened. The seal 26 may be mounted to the vehicle body 14 and may be configured to seal an interface between the closure member 12 and the vehicle body 14. For example, the seal 26 may create a watertight seal around a periphery of the closure member 12 and reduce the amount of noise capable of infiltrating into the vehicle interior when the closure member 12 is closed.

As discussed in greater detail below, additional functionality (e.g., a bottle opener feature and/or a bottle cap catch feature) can be integrated into one or both of the first and second hinge assemblies 18, 20 in order to increase the functionality of the closure member system 22 for facilitating a more enjoyable user experience, such as when the vehicle 10 is stationary and being used as a social gathering spot during outdoor activities (e.g., camping, tailgating, etc.), for example.

FIGS. 3, 4, 5, 6, and 7 illustrate additional details associated with the closure member system 22 of FIGS. 1 and 2. Only the first hinge assembly 18 is shown and described relative to the closure member 12 and the vehicle body 14 in FIGS. 3-7. However, in some implementations, the second hinge assembly 18 could include a design that is similar to that of the first hinge assembly 18. In other implementations, the second hinge assembly 20 could include a different design than that of the first hinge assembly 18.

The first hinge assembly 18 may include a body-side hinge bracket 28 and a door-side hinge bracket 30 (see FIG. 1). The door-side hinge bracket 30 may be pivotably connected to the body-side hinge bracket 28 by a pivot pin 36 (see FIG. 3).

Figure 6:
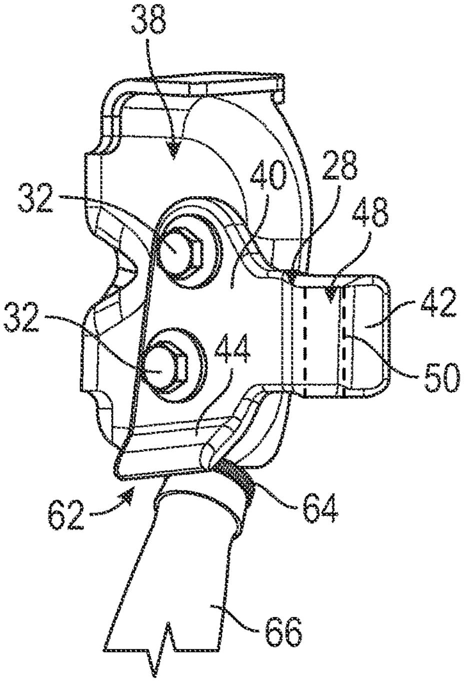
FIG. 6 illustrates an assembly of a hinge bracket and a hinge attach bracket of a vehicle closure member system.
Figure 7:
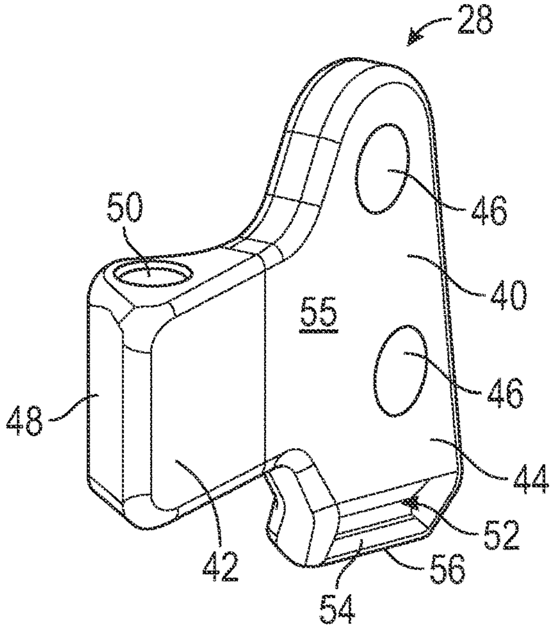
FIG. 7 is a rear perspective view of the hinge bracket of FIG. 6.

The body-side hinge bracket 28 may be mounted relative to the vehicle body 14 by one or more mechanical fasteners 32 (see FIG. 6). In an embodiment, the mechanical fasteners 32 secure the body-side hinge bracket 28 to a hinge attach bracket 38. The hinge attach bracket 38 may be secured to the vehicle body 14 by one or more additional mechanical fasteners (not shown) for securing the body-side hinge bracket 28 relative to the vehicle body 14.

In an embodiment, the body-side hinge bracket 28 is constructed from a forged steel, and the hinge attach bracket 38 is constructed from a stamped steel. However, other materials are contemplated within the scope of this disclosure.

The door-side hinge bracket 30 may be mounted to an exterior surface 99 of the closure member 12 by one or more mechanical fasteners 34 (best shown in FIG. 1). The exterior surface 99 may be referred to as the "class A-surface" of the closure member 12.

The body-side hinge bracket 28 may include a main body portion 40, a first arm 42 that extends in a first direction away from the main body portion 40, and a second arm 44 that extends in a second different direction away from the main body portion 40. In an embodiment, the first arm 42 extends rearwardly from the main body portion 40, and the second arm 44 extends downwardly from the main body portion 40. However, other configurations are contemplated within the scope of this disclosure.

A plurality of openings 46 (best shown in FIG. 7) may be formed through the main body portion 40 of the body-side hinge bracket 28. Each opening 46 may be sized to receive one of the mechanical fasteners 32 for mounting the body-side hinge bracket 28 to the hinge attach bracket 38 in the manner shown in FIG. 6. In an embodiment, the openings 46 are machined openings.

The first arm 42 of the body-side hinge bracket 28 may include a barrel mount 48. An opening 50 may be formed through the barrel mount 48. The opening 50 may be sized to receive the pivot pin 36 for pivotably connecting the door-side hinge bracket 30 to the body-side hinge bracket 28. In an embodiment, the opening 50 is a machined opening.

The second arm 44 of the body-side hinge bracket 28 may extend below the openings 46 of the main body portion 40. An interior side 55 (e.g., the side facing the hinge attach bracket 38) of the second arm 44 may include a recessed cavity 52. A lower wall 54 that bounds the recessed cavity 52 may include a contact edge 56. In an embodiment, the contact edge 56 is a machined surface of the lower wall 54. The contact edge 56 of the lower wall 54 may be accessible through an opening 65 formed in the trim piece 24.

In a mounted position, the recessed cavity 52 of the second arm 44 may open toward a lower edge 58 of the hinge attach bracket 38. The lower edge 58 may provide a contact surface 60 that is adjacent to the contact edge 56 of the lower wall 54.

The contact edge 56 and the contact surface 60 may cooperate to provide a bottle opener feature 62 that is integrated as part of the body-side hinge bracket 28 of the first hinge assembly 18 of the closure member system 22. For example, as further discussed below, the contact edge 56 may be configured for applying an opening force for removing a bottle cap 64 from a bottle 66, and the contact surface 60 may support and stabilize the bottle 66 as its position is manipulated to remove the bottle cap 64 from the bottle 66 via the contact edge 56. The bottle opener feature 62 therefore provides additional functionality to the first hinge assembly 18 beyond simply supporting the closure member 12 relative to the vehicle body 14.

The opening 65 of the trim piece 24 may open into a trough 68 (best shown in FIGS. 4-5) of the trim piece 24. The opening 65 and the trough 68 may cooperate to provide a bottle cap catch feature 70 that is integrated as part of the trim piece 24 of the closure member system 22. For example, as further discussed below, the trough 68 may catch and store the bottle cap 64 after it is dislodged from the bottle 66 by the bottle opener feature 62. The bottle cap catch feature 70 therefore provides additional functionality to the trim piece 24 beyond aesthetics.

Figure 4:
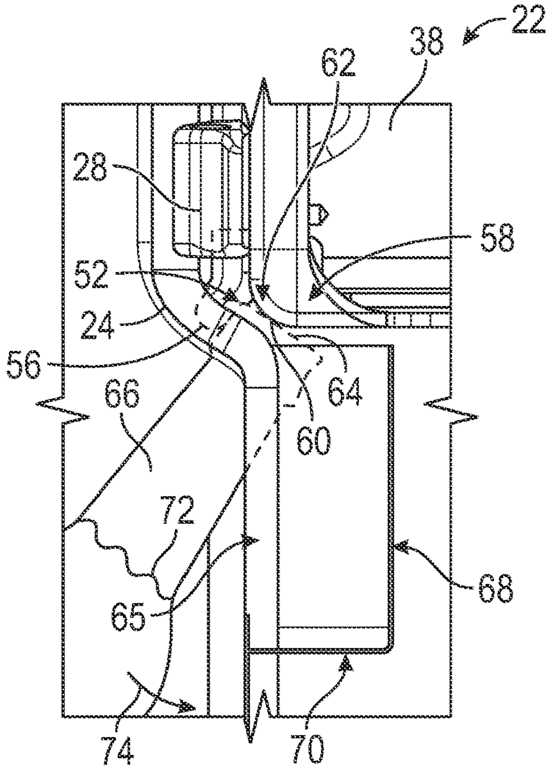
FIG. 4 is a rear view of select portions of the closure member system of FIG. 3.
Figure 5:
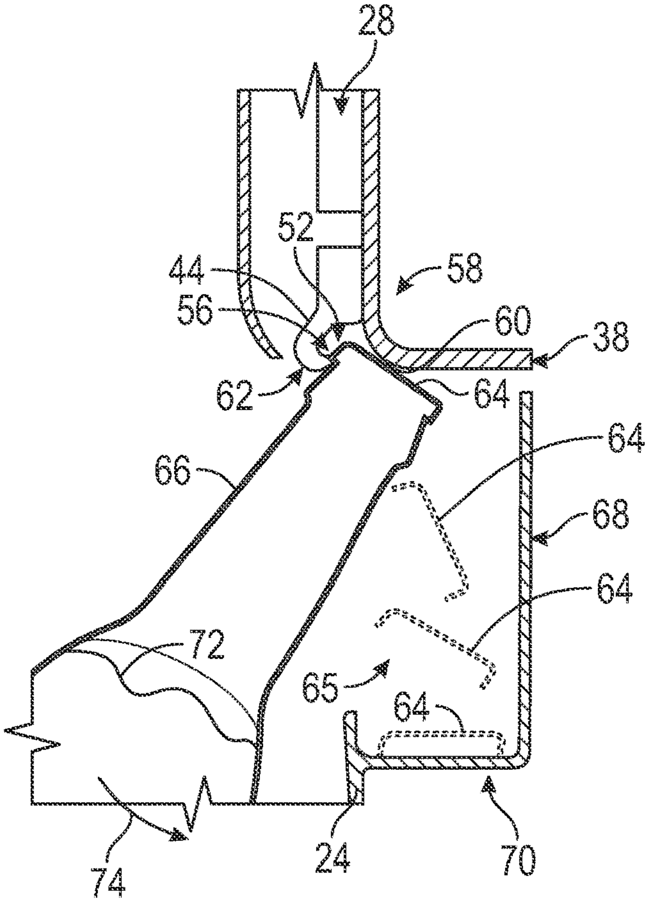
FIG. 5 is a cross-sectional view through section 5-5 of FIG. 2.

An exemplary use of the integrated bottle opener feature 62 for opening the bottle 66 that contains a beverage 72 is schematically shown in FIGS. 2, 4, and 5. The integrated bottle opener feature 62 and the bottle cap catch feature 70 are accessible by users when the closure member 12 is in an open position and the vehicle 10 is stationary, such as when the vehicle 10 is being used for outdoor social gatherings, for example. Prior to opening, the beverage 72 is contained within the bottle 66 by the bottle cap 64. The bottle opener feature 62 may be used to remove the bottle cap 64 without spilling the beverage 72 and eliminates the need for the user to remember to carry a separate bottle opener, and the bottle cap catch feature 70 may be used to temporarily store the bottle cap 64 once removed from the bottle 66 by the bottle opener feature 62.

The bottle opener feature 62 may be used to remove the bottle cap 64 from the bottle 66 in the following exemplary manner. A user may first position the bottle 66 so the bottle cap 64 is at least partially received within the opening 65 of the trim piece 24 at a location adjacent to the recessed cavity 52 of the second arm 44 of the body-side hinge bracket 28. The bottle 66 may be moved into the opening 65 until the bottle cap 64 is received in abutting contact with the contact surface 60 of the lower edge 58 of the hinge attach bracket 38. The contact surface 60 positions the bottle cap 64 such that a downward swing path (shown schematically via arrow 74) is required to remove the bottle cap 64 from the bottle 66. The user is thus not permitted to position the bottle 66 at a downward angle relative to the bottle opener feature 62, thereby substantially eliminating spills.

As the user moves the bottle 66 along the downward swing path 74, the bottle cap 64 is moved into engagement with the contact edge 56, thereby applying an opening force for removing the bottle cap 64 from the bottle 66. The contact surface 60 may support and stabilize the bottle 66 during its movement along the downward swing path 74. The dislodged bottle cap 64 may be captured within the trough 68 of the bottle cap catch feature 70 for temporary storage, thereby maintaining a clean camp/tailgating site.

The closure member systems of this disclosure include integrated bottle opener and bottle cap capture features that are packaged together with hinge and trim components, respectively, thereby incorporating additional functionality within the closure member system without requiring additional parts or complexity. The integrated features are conveniently packaged near a cargo space of the vehicle and are accessible when the closure member is open and the vehicle is stationary to facilitate a more enjoyable usage and experience during outdoor social gatherings.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle closure member system, comprising:

a hinge assembly including a hinge attach bracket, a body-side hinge bracket mounted to the hinge attach bracket, and a door-side hinge bracket that is movably connected to the body-side hinge bracket by a pivot pin; and a bottle opener feature configured to remove a bottle cap from a bottle, the bottle opener feature established by a contact edge of an arm of the body-side hinge bracket and a contact surface of the hinge attach bracket.

2. The vehicle closure member system as recited in claim 1, wherein the contact edge is part of a lower wall that bounds a recessed cavity of the arm.

3. The vehicle closure member system as recited in claim 1, wherein the contact edge and the contact surface of the hinge attach bracket cooperate to apply an opening force for removing the bottle cap from the bottle.

4. The vehicle closure member system as recited in claim 1, wherein the body-side hinge bracket is at least partially concealed by a trim piece.

5. A vehicle closure member system, comprising:

a hinge bracket;

a bottle opener feature at least partially provided by a portion of the hinge bracket;

the hinge bracket is at least partially concealed by a trim piece; and a bottle cap catch feature is provided by the trim piece.

6. The vehicle closure member system as recited in claim 5, wherein an opening and a trough of the trim piece cooperate to establish the bottle cap catch feature.

7. A vehicle, comprising:

a vehicle body;

a closure member movable between a closed position and an open position relative to the vehicle body;

a first hinge assembly configured to movably support the closure member relative to the vehicle body, wherein the first hinge assembly includes an integrated bottle opener feature that is concealed when the closure member is in the closed position and exposed for use when the closure member is in the open position;

the first hinge assembly is at least partially concealed by a trim piece; and a bottle cap catch feature is provided by the trim piece.

8. The vehicle as recited in claim 7, wherein the first hinge assembly includes a body-side hinge bracket that provides the integrated bottle opener feature.

9. The vehicle as recited in claim 8, wherein the body-side hinge bracket is secured to a hinge attach bracket, and the hinge attach bracket is mounted to the vehicle body.

10. The vehicle as recited in claim 9, wherein the integrated bottle opener feature is established by a contact edge of an arm of the body-side hinge bracket and a contact surface of a lower edge of the hinge attach bracket.

11. The vehicle as recited in claim 10, wherein the contact edge is part of a lower wall that bounds a recessed cavity of the arm.

12. The vehicle as recited in claim 7, wherein an opening and a trough of the trim piece cooperate to establish the bottle cap catch feature.

13. The vehicle as recited in claim 12, wherein the integrated bottle opener feature is accessible through the opening of the trim piece.

14. The vehicle as recited in claim 12, wherein the trough is configured to capture a bottle cap that has been dislodged from a bottle by the integrated bottle opener feature.

15. The vehicle closure member system as recited in claim 1, wherein an interior side of the body-side hinge bracket includes a recessed cavity, and a lower wall that bounds the recessed cavity includes the contact edge.

16. The vehicle closure member system as recited in claim 5, wherein the bottle opener feature is accessible through an opening of the trim piece.

17. The vehicle closure member system as recited in claim 1, wherein the body-side hinge bracket includes a main body portion, the arm extending from the main body portion and including the contact edge, and a second arm extending from the main body portion in a different direction than the arm.

18. The vehicle closure member system as recited in claim 17, wherein the pivot pin connects the door-side hinge bracket to the body-side hinge bracket at the second arm.

19. The vehicle closure member system as recited in claim 1, wherein the contact surface is configured to position the bottle cap such that a downward swing path is required to disengage the bottle cap from the bottle.

20. The vehicle closure member system as recited in claim 1, wherein the arm curves in a direction toward the hinge attach bracket.

* * * * *